No. 836,248. PATENTED NOV. 20, 1906.
C. R. & O. G. FERGUSON.
FISH TRAP.
APPLICATION FILED AUG. 11, 1906.

Witnesses
T. P. Britt
M. O. Bowling

Inventors
C. R. Ferguson
O. G. Ferguson

By Swift &C.
Attorneys

UNITED STATES PATENT OFFICE.

CLIFTON ROBERT FERGUSON AND OWEN G. FERGUSON, OF MICANOPY, FLORIDA.

FISH-TRAP.

No. 836,248.

Specification of Letters Patent.

Patented Nov. 20, 1906.

Application filed August 11, 1906. Serial No. 330,250.

*To all whom it may concern:*

Be it known that we, CLIFTON ROBERT FERGUSON and OWEN G. FERGUSON, citizens of the United States, residing at Micanopy, in the county of Alachua and State of Florida, have invented a new and useful Fish-Trap; and we do hereby declare the following to be a full, clear, and exact description of the invention, such as will enable others skilled in the art to which it appertains to make and use the same.

The invention relates to improvements in fish-traps, and has for its object to provide a simple, inexpensive, and durable device of this character which can be quickly and easily made of wire-netting and wire frame or supporting members and having a novel door hinged to said wire frame.

With these and other objects in view the invention consists in the novel construction and arrangement of parts hereinafter described and illustrated, and particularly pointed out in the appended claims.

Figure 1:
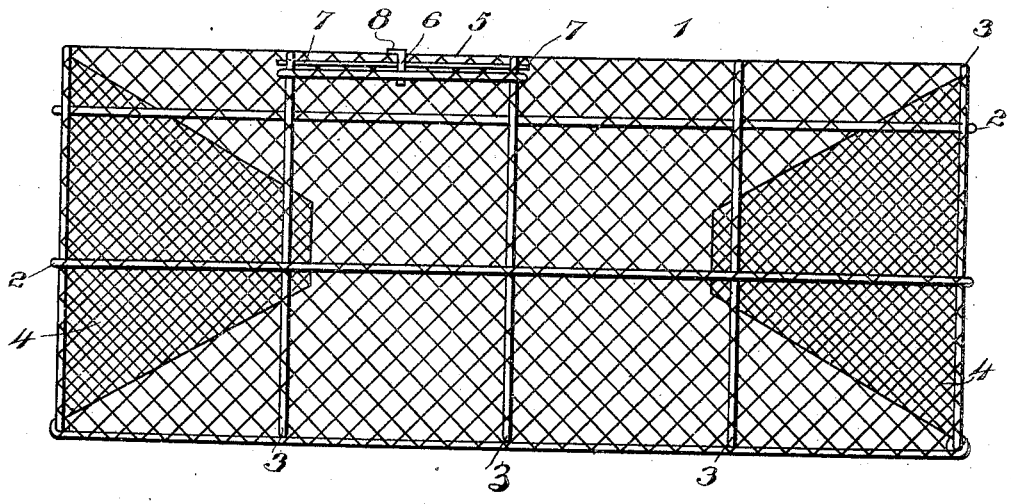
Figure 2:
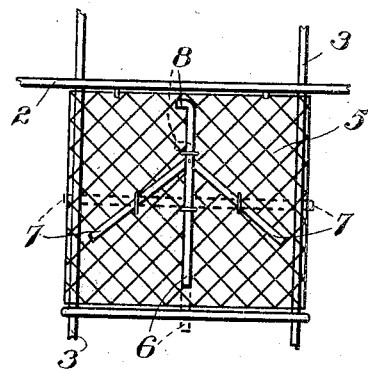
Figure 3:
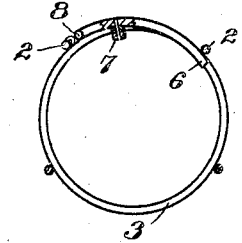

In the drawings, Figure 1 is a side elevation of a fish-trap constructed in accordance with this invention. Fig. 2 is a plan view of the door. Fig. 3 is a transverse sectional view through the trap, the wire-netting being removed.

Referring to the drawings, 1 designates the body of our trap, which is constructed of suitable wire-netting rolled into the form of a cylindrical body. The length of the body portion is preferably six feet long, but may of course be varied according to the requirements. The body portion is supported by several stout longitudinal wires 2, arranged at intervals and extending the entire length of the trap. These wires are intermeshed with the wire-netting. The body of said trap is further strengthened by stout circular wires 3, also intermeshing with the wire-netting.

Each end of the trap is provided with truncated cones 4, projecting inwardly, through which the fish enter the trap. These cones are firmly secured to the trap. A door 5 is provided on the body portion of the trap for taking the fish out.

In Fig. 2 is shown a plan view of the door 5, which is hinged to one of the longitudinal wires 2 and is provided with novel locking mechanism having a reciprocating rod 6, provided with side members 7, pivoted thereto. The rod 6 is pushed forward and the side members spread out and pass under the wires 3, while the rod 6 passes under a longitudinal wire, as shown in dotted lines in Fig. 2. When it is desired to unlock the door, the rod 6 is withdrawn. The rod 6 is provided with a bent portion 8, which enables the operation of locking and unlocking to be performed with ease and despatch.

Having thus described our invention, what we claim, and desire to obtain by Letters Patent, is—

1. A fish-trap composed of wire-netting, rolled into the form of a cylinder, and having stout longitudinal wires intermeshing with said netting, curved wires of similar character connected with said longitudinal wires, truncated cones mounted in each end of said trap, a door pivotally mounted on one of said longitudinal wires, and having a reciprocating pin mounted thereon, one end of said pin being bent to form a handle, said pin being provided with side pins or members pivoted thereto, said pins being adapted to engage a longitudinal wire and curved wires for locking said door, and loops for limiting the movement of said pins.

2. A device of the class described, having transverse and longitudinal wires, cones adapted for the admission of fish, a door pivotally mounted on one of said longitudinal wires, and a locking device mounted on said door, and engaging the sides and one end thereof, substantially as described.

In testimony whereof we have signed our names to this specification in the presence of two subscribing witnesses.

CLIFTON ROBERT FERGUSON.
OWEN G. FERGUSON.

Witnesses:
H. L. MERRY,
THOS. MCCREDIE.